Feb. 12, 1935.  J. F. LEVENTHAL  1,990,791
ADJUSTABLE OPTICAL SYSTEM
Filed May 10, 1934   2 Sheets-Sheet 1

INVENTOR
Jacob F Leventhal
BY
Kenyon Kenyon
ATTORNEYS

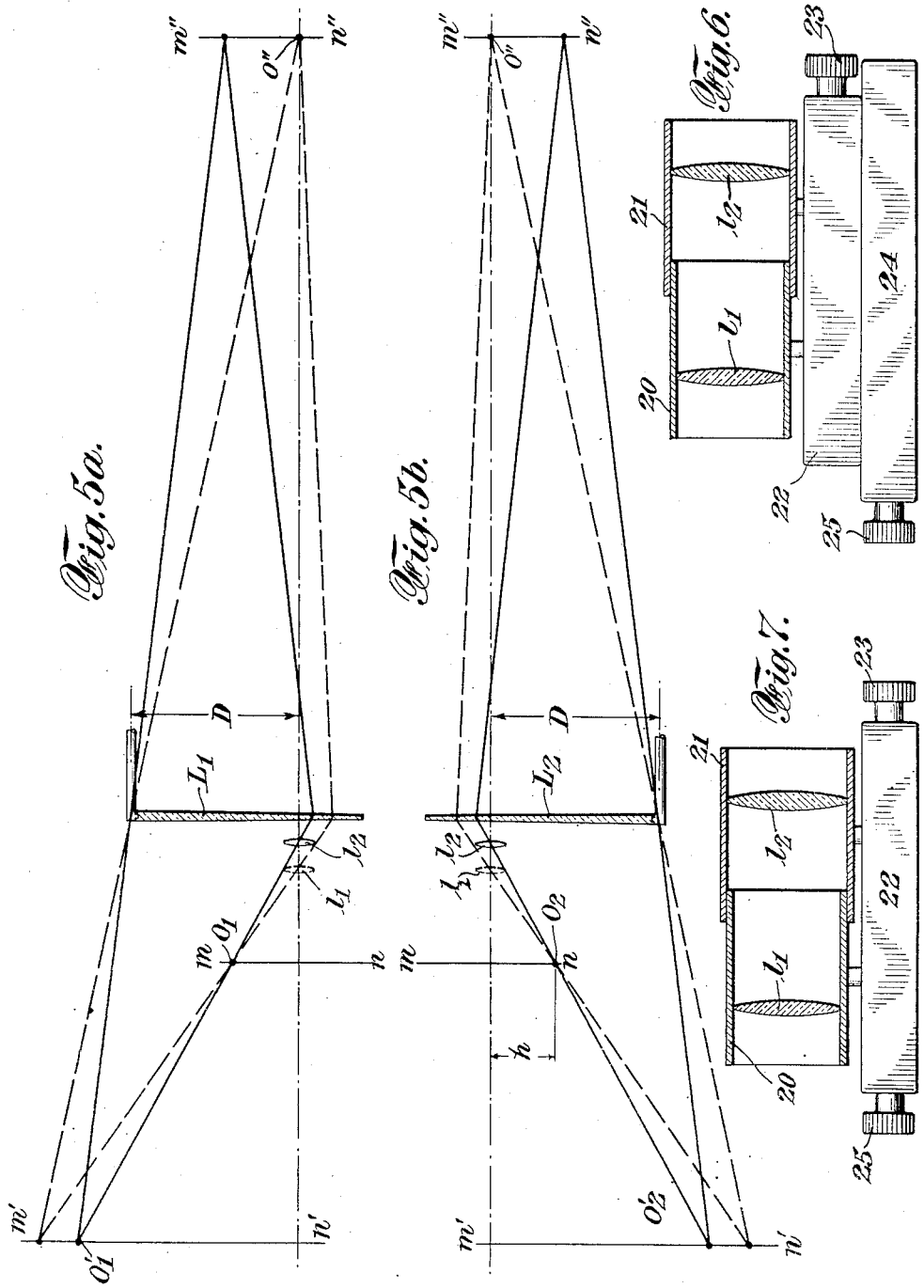

Patented Feb. 12, 1935

1,990,791

UNITED STATES PATENT OFFICE 1,990,791

ADJUSTABLE OPTICAL SYSTEM

Jacob F. Leventhal, New York, N. Y., assignor to Leventhal Patents, Inc., New York, N. Y., a corporation of Delaware Application May 10, 1934, Serial No. 724,837

16 Claims. (Cl. 88—16.8)

This invention relates to motion picture apparatus of the type in which the feeding of the film is continuous and uniform and pertains more particularly to an adjustable optical system for such apparatus.

In my co-pending application, Serial No. 546,791 filed June 25, 1931, I show an apparatus of the type above referred to having an optical compensator which provides two compensation-cycles per picture cycle and produces consecutively two stationary images of the desired picture, spaced apart, in the direction of film travel a distance equal to half the height of a film picture. The advantage of this is that since the aberrations of practically all compensators increase with the amount of compensation produced, the decreased amount of required compensation (in this case one-half) will result in a screen picture having considerably less aberration. The spaced images so produced must be re-imaged in register at the screen plane and, for this purpose, as shown in my co-pending application, Ser. No. 648,801, filed December 24, 1932, I provide in addition to the usual projection objective lens, two auxiliary lenses each singly cooperative with the objective lens to re-image one of said spaced images. The optical center of each auxiliary lens lies on a line joining the center of one of the spaced compensated images and the center of the screen image. Each auxiliary lens is rendered effective at the time it is required to image its particular one of the spaced images, either by uncovering it while covering the other with a rotating obturator as is the case when the auxiliary lenses are stationary, or by rotating it into position while rotating the other out of position, as is the case when the auxiliary lenses are rotatable.

Accurate registration of the image depends on proper correlation of (1) the focal length of the main objective lens; (2) the focal length of the auxiliary lenses; (3) the distance between corresponding points of the spaced images; (4) the distance between the centers of the auxiliary lenses; and (5) the spacing between the main objective lens and the plane of the auxiliary lenses. An error in any one of these factors results in incorrect registration of the images. A correction applied to any one of these will overcome mis-registration due to errors of any one or all of the others.

An object of this invention is to provide for simple manual adjustment of the above described optical system to correct an incorrect factor while observing the effect on the screen images of the adjustment and without affecting the focus of such images.

Other objects, novel features and advantages of this invention will be apparent from the following specification and accompanying drawings, wherein.

Figs. 5a and 5b schematically illustrate corrections effected by change in the focal length of the objective lens; and Figs. 6 and 7 are vertical sections of the objective lens showing means for adjusting the focal length.

Figure 1:
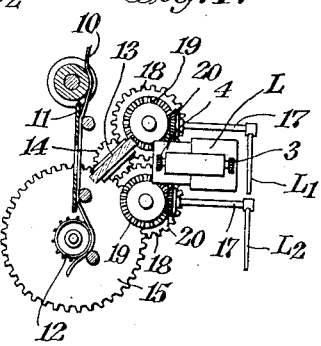
Fig. 1 is a section through an apparatus embodying the invention.

Referring now to Fig. 1, a film 10 is drawn through a film gate 11 by a film feeding sprocket 12. The optical compensator comprises a plane-parallel rotatable plate 13 which is connected to the feeding sprocket by means of gears 14 and 15 so related that the plate makes a complete revolution while the film is advanced one picture frame.

The compensator produces two stationary spaced virtual images of each film picture and an optical system is provided for re-imaging such virtual images at the screen plane in registering relation. Such optical system consists of a two-part main lens L and a pair of rotatable lens segments $L_1$, $L_2$, carried by shafts 17 having their axes coincident with the optical axes of the lens segments and parallel to the optical axis of the main lens L. The shafts are driven from the gear 14 by gears 18, 19 and 20 to make one rotation for each rotation of the compensator. The auxiliary lenses are so arranged that they rotate alternately into operative relation with the main lens L during compensating cycles and cooperate with the main lens to re-image the compensated images in registering relation at the screen plane.

Figure 2:
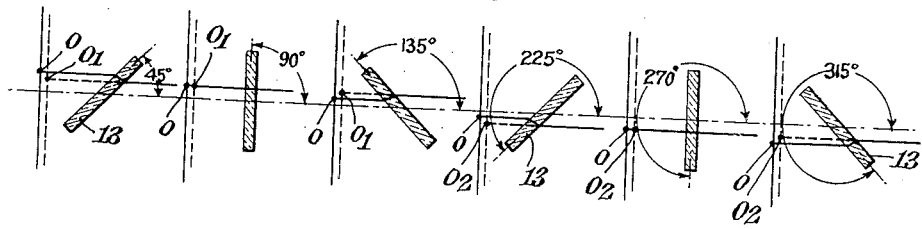
Fig. 2 illustrates schematically two stage compensation.

The method of producing the multiple spaced images from a single picture during a picture cycle is shown schematically in Fig. 2, where the rotating plane-parallel plate 13 acts on light from the moving luminous film-point to produce, by refractive displacement and by virtue of correct thickness, the virtual stationary images $O_1$ and $O_2$ spaced apart from each other a distance equal to one-half the movement of O during a picture cycle. Each rotation of the plate produces two images, the plate being arranged to rotate once per picture cycle. The plate obviously cannot be used during its entire rotation and in practice, the light is cut off while the plate is in the extreme angular positions.

Figure 3:
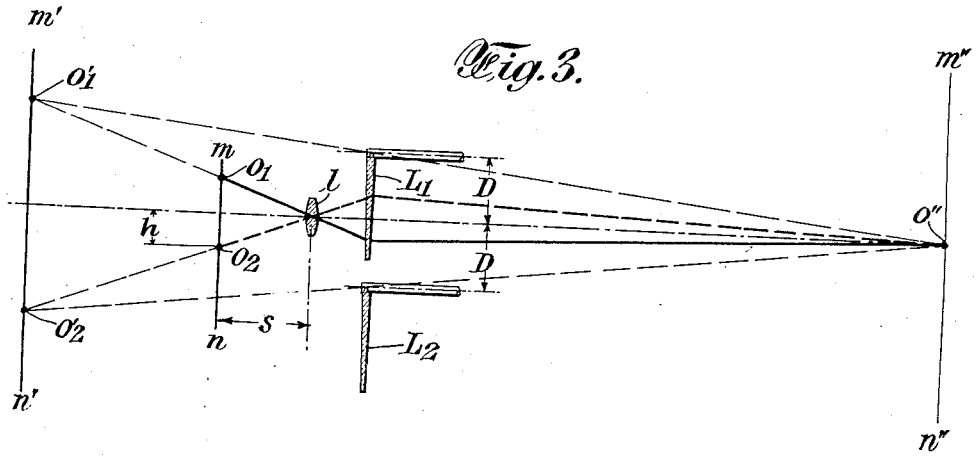
Fig. 3 illustrates schematically the re-imaging means.

At Fig. 3 is shown schematically the means for re-imaging two spaced images in register at the screen plane. The compensator is not shown, the points $O_1$ and $O_2$ in the plane $mn$ being considered as stationary compensated points successively appearing. The main objective lens $l$ is so placed with respect to the points $O_1$ and $O_2$ that virtual images of them are produced at $O'_1$ and $O'_2$ in the plane $m'n'$. These points are in turn "seen" selectively by the auxiliary lenses $L_1$ and $L_2$. A line from one of the points passing through the center of its related lens and represented as a broken line will intersect the screen plane $m''n''$ at the point of required registration $O''$, when analyzed geometrically. Actually, light from point $O_1$ passes through lens $l$ to $L_1$ and is bent to $O''$ as shown by the solid line. The auxiliary lenses $L_1$ and $L_2$ are rotatable segments in the illustration, each rotating into effective relation with the main lens $l$ at the proper time.

It is obvious that an error in any one of the five factors mentioned heretofore will produce non-registration. For example, an excess or deficiency in the distance $2D$ between the axes of the auxiliary lenses or in the distance $2h$ between the image points $O_1$ and $O_2$ will cause the images of $O'_1$ and $O'_2$ to be formed at points removed from the required registration point $O''$ although still lying in the screen plane $m''n''$. These examples will be later amplified in connection with Figs. 5a and 5b.

In this invention the lens $l$ is made up of two spaced elements, adjustable to vary the spacing whereby the focal length of the lens may be changed. The effective focal length $f_e$ of such a lens is derived from the formula $$f_e = \frac{f_1 f_2}{f_1 f_2 - d}$$

where $f_1$ is the focal length of one element, $f_2$ of the other and $d$ the spacing between them. It is obvious from the formula that $f_e$ will increase and decrease with increase and decrease of $d$. As will be later explained, an error in one of the above mentioned factors may be compensated for by changing the focal length of the lens $l$. However, in order to keep the images in focus at the screen plane, it is necessary that the plane $m'n'$ remain fixed with change of the focal length of the lens $l$. If it did not, then the lenses $L_1$ and $L_2$ could not image the points $O'_1$ and $O'_2$ in focus at the plane $m''n''$, but would image them in focus at some other plane. Thus, it would be possible to gain correct registration but only with out-of-focus images. Briefly stated then, the problem is to make possible changes of focal length of $l$ while maintaining fixed the conjugate planes $mn$ and $m'n'$.

Figure 4A:
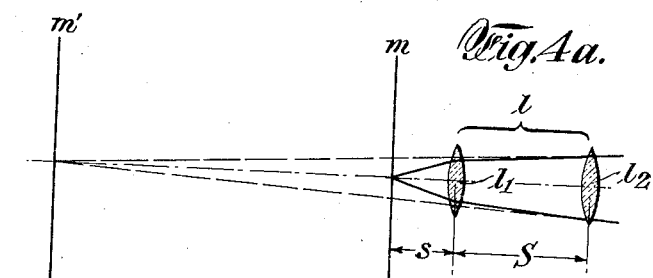
Figs. 4a and 4b illustrate schematically means for adjusting the focal length of the objective lens.
Figure 4B:
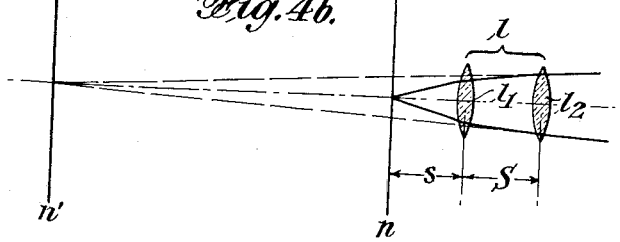

In Figs. 4a and 4b is illustrated the procedure involved in changing the focal length of lens $l$ without affecting the conjugate planes. The lens $l$ is made up of two elements, one $l_1$ of 3" focal length and the other $l_2$ of 6" focal length. In Fig. 4a, the space $S$ is 3" and in Fig. 4b, it is 1.68". Therefore, the effective focal lengths $f_e$ of the lens $l$ are, according to formula, $$\frac{3 \times 6}{3+6-3} = 3" \text{ and } \frac{3 \times 6}{3+6-1.6795} = 2.46"$$

respectively. Change of position of the planes $mn$ and $m'n'$ is avoided by moving the lens $l$ to suitably change the distances between the plane $mn$ and the plane of the lens element $l_1$. In Fig. 4a, such distance is 1.349" while in Fig. 4b it is 1.6695 representing a movement away from $mn$ of .3205". The other lens element $l_2$ which in Fig. 4a is 4.349" from $mn$ is, in Fig. 4b, 3.349" from $mn$ or a decrease of 1". The lenses therefore do not move at the same rate and in general it may be said that one lens has about three times the movement of the other.

Figs. 5a and 5b illustrate the correction of errors by manipulation of the lens $l$. For simplicity's sake, the lens $l$ is illustrated as a single lens of changeable focal length, but it is to be understood that in practice the lens $l$ is a two-part lens such as previously described and such as is illustrated in detail in Figs. 6 and 7. This conception of the lens $l$ does not interfere with the correctness of the explanation since it is well-known in optics that a single lens can always be found to replace two or more lenses in combination. Also for simplicity, only half of the lens system is shown in each of Figs. 5a and 5b as reference to Fig. 3 will show that the system is symmetrical. Fig. 5a illustrates the first compensation stage while Fig. 5b illustrates the second compensation stage.

Fig. 5a illustrates a correction for the case where the distance $D$ is too great for the original setting of the remainder of the system. In such case, as is shown by the full lines, the point $O'_1$ is imaged at a point other than the registration point $O''$, and the line from $O'_1$ through the center of auxiliary lens $L_1$ terminates in the screen plane at such point. This condition is remedied by changing the focal length of the lens $L$ and moving the same to the position shown in dotted lines. The point $O'_1$ is thereby moved upward in the plane $m'n'$ to a position such that the line passing from it through the center of the lens $L_1$ meets the screen plane $m''n''$ at the registration point $O''$. The corrected condition is illustrated in broken or dotted lines.

Fig. 5b illustrates the case where the distance $h$ is too small for the original setting of the remainder of the system. In such case, as is shown by the full lines, the point $O'_2$ is imaged at a point other than the registration point $O''$, and the line from $O'_2$ through the center of auxiliary lens $L_2$ terminates in the screen plane at such point. This condition is remedied by changing the focal length of the lens $L$ and moving the same to the position shown in dotted lines. The point $O'_2$ is thereby moved upward in the plane $m'n'$ to a position such that the line passing from it through the center of the lens $L_2$ meets the screen plane $m''n''$ at the registration point $O''$. The corrected condition is illustrated in broken or dotted lines.

The correction for an error in the location of the axes of the auxiliary lenses works out conversely to the correction for inaccuracy in the location of the points $O_1$ and $O_2$. Corrections for error in the focal length of the auxiliary lenses and the spacing between the plane of the main objective lens and the plane of the auxiliary lens may likewise be made by change of the focal length of the main lens and adjustment of the main lens.

Figs. 5 and 6 show different mountings for the main lens which permit relative adjustment of the two elements and adjustment of the position of the effective center of the composite lens.

In Fig. 6, the lens $l_1$ is shown as being mounted in a tube 20, the end of which extends into a tube 21 in which is mounted the lens $l_2$. The tube 20 is rigidly mounted on a plate 22 while the tube 21 is mounted for sliding movement on the plate and is actuated by means of a rotatable rod 23 having screw-threaded engagement with a portion of the support for the tube 21 so that rotation of the rod 23 effects sliding movement of the tube 21. The plate 22 is slidably mounted upon a plate 24 and has screw-threaded connection with a rod 25 rotatably mounted in the plate 24 so that rotation of the rod 25 effects movement of the plate 22. The effective focal length of the main objective lens $l$ is varied by turning the rod 23 while the position of the effective center of the lens is adjusted by turning the rod 25. The structure in Fig. 7 is substantially the same except that the plate 24 is dispensed with and the rods 23 and 25 are both mounted in the plate 22 and the rod 25 has screw-threaded connection with the support for the tube 20 which, in this case, is mounted for sliding movement on the plate 22. By manipulation of the rods 23 and 25, the focal length of the lens $l$ may be varied and simultaneously the position of the effective center of the lens may be adjusted. Also, the lenses might be supported for relative movement in accordance with the disclosure in the Fouquet Patent No. 1,922,537 and with such construction, one controlling movement will automatically move both lenses at the proper rate to effect the desired adjustment.

It is, of course, understood that the arrangement above described is not effective to correct for errors of large magnitude since it is possible only to make a limited change of focal length and the errors to be corrected are thus lying within the limited range ordinarily made with all mechanical optical apparatus.

I claim:

1. In an optical system for establishing optical conjugacy between N spaced points lying in a plane and a single point lying in a second plane, a lens combination, optically intermediate said planes and comprising a main lens, N auxiliary lenses, each auxiliary lens being individual to one of said spaced points and individually cooperative with said main lens to render such point optically conjugate with said single point, means for rendering each auxiliary lens singly cooperative with the main lens, and means for changing the focal length of the main lens.

2. In an optical system for establishing optical conjugacy between N spaced points lying in a plane and a single point lying in a second plane, a lens combination optically intermediate said planes and comprising a main lens, N auxiliary lenses, each auxiliary lens being individual to one of said spaced points and individually cooperative with said main lens to render such point optically conjugate with said single point, means for rendering each auxiliary lens singly cooperative with the main lens, and means for changing the focal length of the main lens and moving the effective center of the main lens along its optical path.

3. In an optical system for establishing optical conjugacy between N spaced points lying in a plane and a single point lying in a second plane, a lens combination optically intermediate said planes and comprising a main lens, N rotatable lens segments, each lens segment being individual to one of said spaced points and individually co-operative with said main lens to render such point optically conjugate with said single point, means for rotating said lens segments individually into operative relation with the main lens, and means for varying the focal length of said main lens.

4. In an optical system for establishing optical conjugacy between N spaced points lying in a plane and a single point lying in a second plane, a lens combination optically intermediate said planes and comprising a main lens, N rotatable lens segments, each lens segment being individual to one of said spaced points and individually co-operative with said main lens to render such point optically conjugate with said single point, means for rotating said lens segments individually into operative relation with the main lens, and means for varying the focal length of said main lens and moving the effective center of said main lens along the optical axis thereof.

5. In an optical system for establishing optical conjugacy between N spaced points lying in a plane and a single point lying in a second plane, a lens combination optically intermediate said planes and comprising a two-element main lens, N auxiliary lenses, each auxiliary lens being individual to one of said spaced points and individually cooperate with said main lens to render such point optically conjugate with said single point, means for rendering each auxiliary lens singly cooperative with the main lens, and means for varying the spacing between said elements.

6. In an optical system for establishing optical conjugacy between N spaced points lying in a plane and a single point lying in a second plane, a lens combination optically intermediate said planes and comprising a two-element main lens, N auxiliary lenses, each auxiliary lens being individual to one of said spaced points and individually cooperative with said main lens to render such point optically conjugate with said single point, means for rendering each auxiliary lens singly cooperative with the main lens, and means for moving each element of the main lens relative to the other axially of said main lens.

7. In an optical system for establishing optical conjugacy between N spaced points lying in a plane and a single point lying in a second plane, a lens combination optically intermediate said planes and comprising a two-element main lens, N rotatable lens segments, each lens segment being individual to one of said spaced points and individually cooperative with said main lens to render such point optically conjugate with said single point, means for rotating said lens segments individually into operative relation with the main lens, and means for varying the spacing between the elements of the main lens.

8. In an optical system for establishing optical conjugacy between N spaced points lying in a plane and a single point lying in a second plane, a lens combination optically intermediate said planes and comprising a two-element main lens, N rotatable lens segments, each lens segment being individual to one of said spaced points and individually cooperative with said main lens to render such point optically conjugate with said single point, means for rotating said lens segments individually into operative relation with the main lens, and means for moving each element of the main lens relative to the other axially of said main lens.

9. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane comprising a lens combination optically intermediate said planes, said main lens consisting of a main lens, N auxiliary lenses, each auxiliary lens being individual to one of said spaced points and individually cooperative with said main lens to render such point optically conjugate with said single point, means for rendering each auxiliary lens singly cooperative with the main lens, and means for changing the focal length of the main lens.

10. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane comprising a lens combination optically intermediate said planes, said lens combination comprising a main lens, N auxiliary lenses, each auxiliary lens being individual to one of said spaced points and individually cooperative with said main lens to render such point optically conjugate with said single point, means for rendering each auxiliary lens singly cooperative with the main lens, and means for changing the focal length of the main lens and moving the effective center of the main lens along its optical path.

11. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane, comprising a lens combination optically intermediate said planes, said lens combination comprising a main lens, N rotatable lens segments, each lens segment being individual to one of said spaced points and individually co-operative with said main lens to render such point optically conjugate with said single point, means for rotating said lens segments individually into operative relation with the main lens, and means for varying the focal length of said main lens.

12. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane, comprising a lens combination optically intermediate said planes, said lens combination comprising a main lens, N rotatable lens segments, each lens segment being individual to one of said spaced points and individually co-operative with said main lens to render such point optically conjugate with said single point, means for rotating said lens segments individually into operative relation with the main lens, and means for varying the focal length of said main lens and moving the effective center of said main lens along the optical axis thereof.

13. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane comprising a two-element main lens, N auxiliary lenses, each auxiliary lens being individual to one of said spaced and individually cooperative with said main lens to render such point optically conjugate with said single point, means for rendering each auxiliary lens singly cooperative with the main lens, and means for varying the spacing between said elements.

14. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane, comprising a lens combination optically intermediate said planes, said lens combination comprising a two-element main lens, N auxiliary lenses, each auxiliary lens being individual to one of said spaced points and individually cooperatve with said main lens to render such point optically conjugate with said single point, means for rendering each auxiliary lens singly cooperative with the main lens, and means for moving each element of the main lens relative to the other axially of said main lens.

15. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationary points lying in a common plane, means for establishing optical conjugacy between said N spaced points and a single point in a second plane, comprising a lens combination optically intermediate said planes, said lens combination comprising a two-element main lens, N rotatable lens segments, each lens segment being individual to one of said spaced points and individually cooperative with said main lens to render such point optically conjugate with said single point, means for rotating said lens segments individually into operative relation with the main lens, and means for varying the spacing between the elements of the main lens.

16. In a motion picture apparatus, means for feeding film at uniform linear speed, movable optical compensating means, timing means between the film feeding means and the compensating means to effect during movement of the film through a single picture cycle movement of the compensating means through N compensation cycles whereby a point on the moving film is rendered optically conjugate successively with each of N spaced stationery points lying in a common plane, means for establishing optical conjugacy between said N spaced points and a single point in a second plane comprising a lens combination optically intermediate said planes, said lens combination comprising a two-element main lens, N rotatable lens segments, each lens segment being individual to one of said spaced points and individually cooperative with said main lens to render such point optically conjugate with said single point, means for rotating said lens segments individually into operative relation with the main lens, and means for moving each element of the main lens relative to the other axially of said main lens.

JACOB F. LEVENTHAL.